United States Patent [19]

Sampson

[11] Patent Number: 5,556,132
[45] Date of Patent: Sep. 17, 1996

[54] VEHICLE OCCUPANT RESTRAINT WITH AUTO IGNITION MATERIAL

[75] Inventor: William P. Sampson, Mesa, Ariz.

[73] Assignee: TRW Inc., Lyndhurst, Ohio

[21] Appl. No.: 421,736

[22] Filed: Apr. 13, 1995

[51] Int. Cl.⁶ ................................................. B60R 21/26
[52] U.S. Cl. .......................................... 280/741; 422/165
[58] Field of Search ................................. 280/741, 736, 280/728.1; 102/530, 531, 202, 202.14; 422/164, 167, 165

[56] References Cited

U.S. PATENT DOCUMENTS

| | | | |
|---|---|---|---|
| 4,561,675 | 12/1985 | Adams et al. | 280/734 |
| 4,858,951 | 8/1989 | Lenzen | 280/741 |
| 4,944,528 | 7/1990 | Nilsson et al. | 280/741 |
| 5,100,174 | 3/1992 | Jasken et al. | 280/741 |
| 5,186,491 | 2/1993 | Yoshida et al. | 280/741 |
| 5,241,910 | 9/1993 | Cunningham et al. | 102/530 |
| 5,253,895 | 10/1993 | Bretfeld et al. | 280/736 |
| 5,299,828 | 4/1994 | Nakajima et al. | 280/741 |
| 5,368,329 | 11/1994 | Hock | 280/741 |
| 5,380,039 | 1/1995 | Emery et al. | 280/741 |
| 5,433,147 | 7/1995 | Brede et al. | 102/202.2 |

*Primary Examiner*—Eric D. Culbreth
*Assistant Examiner*—Christopher Ellis
*Attorney, Agent, or Firm*—Tarolli, Sundheim, Covell, Tummino & Szabo

[57] ABSTRACT

An apparatus comprises an inflator housing (12) and gas generating material (90) within the housing (12). The apparatus has an initiator (20) for igniting the gas generating material (90). The initiator (20) has a heat conductive member (180). The heat conductive member (180) contains an auto ignition material (190). The auto ignition material (190) ignites at a temperature lower than the ignition temperature of the gas generating material (90). The heat conductive member (180) has a surface (184) external to the housing (12). The external surface (184) senses a high temperature such as one created by a fire. This temperature is transmitted to the auto ignition material (90), igniting the auto ignition material. The auto ignition material (190), when ignited, starts an ignition train which ignites the gas generating material (90).

17 Claims, 2 Drawing Sheets

VEHICLE OCCUPANT RESTRAINT WITH AUTO IGNITION MATERIAL

BACKGROUND OF THE INVENTION

1. Technical Field

The present invention relates to an inflator for inflating a vehicle occupant restraint, and particularly relates to an initiator in the inflator.

2. Description of the Prior Art

An inflator for an inflatable vehicle occupant restraint, such as an air bag, includes a housing containing a source of inflation fluid. The source of inflation fluid may include an ignitable gas generating material. The inflator is actuated when the vehicle experiences a condition that indicates the occurrence of a collision for which inflation of the air bag is desired. The collision-indicating condition may comprise, for example, the occurrence of a predetermined amount of vehicle deceleration.

The inflator for an air bag commonly includes an initiator having igniter material which ignites when the initiator is actuated. Ignition of the igniter material ignites the gas generating material. The gas generating material, when ignited, generates gas for inflating the air bag. The gas generating material typically ignites at a temperature of about 650° F. or higher.

The inflator may on occasion be subjected to an abnormally high temperature. For example, if a vehicle is involved in a fire, the temperature in the vehicle adjacent the inflator may reach or exceed 650° F. In such a situation, the gas generating material might be at a high enough temperature to ignite.

To avoid ignition of the gas generating material when the ambient vehicle temperature is excessively high, a quantity of auto ignition material is located within the inflator. The auto ignition material is specifically designed to ignite at a lower temperature than the temperature at which the gas generating material ignites. The typical auto ignition material ignites at around 350° F. When the auto ignition material ignites, the gas generating material is ignited. Thus, the gas generating material is ignited when the ambient temperature is about 350° F.

SUMMARY OF THE INVENTION

The present invention is an apparatus for inflating a vehicle occupant restraint. The apparatus comprises an inflator housing. A gas generating material is contained within the housing. The inflator has an initiator for igniting the gas generating material. The initiator has a heat conductive member. The heat conductive member contains an auto ignition material. The auto ignition material ignites at a temperature lower than the ignition temperature of the gas generating material. The heat conductive member has a surface external to the housing. The external surface senses a high temperature, such as one created by a fire. This temperature is transmitted to the auto ignition material, igniting the auto ignition material. The auto ignition material, when ignited, ignites the gas generating material.

In a preferred embodiment of the present invention, the heat conductive member is an elongated probe. The elongated probe is hollow along at least a portion of its length, defining a cavity which contains the auto ignition material.

Preferably, the initiator also has an ignition charge material ignitable by a bridge wire and an output charge material, ignitable by the ignition charge material, to ignite the gas generating material. The elongated probe containing the auto ignition material extends longitudinally through the initiator. The probe has one end which includes the external surface. The opposite end is positioned contiguous with the output charge material contained within the initiator.

The present invention also relates to the initiator for igniting gas generating material. The initiator comprises a body and means connected to said body defining a container. The container contains an ignitable output charge. The initiator comprises a means for igniting the output charge. The initiator also comprises an auto ignition material and a heat conductive member containing the auto ignition material. The heat conductive member extends longitudinally through the initiator body. The heat conductive member has one end adjacent the output charge and a second end exposed to ambient conditions. The auto ignition material when ignited ignites the output charge. The heat conductive member when exposed to ambient heat conveys the ambient heat to the auto ignition material.

BRIEF DESCRIPTION OF THE DRAWINGS

Further features of the present invention will become apparent to those skilled in the art to which the present invention relates from reading the following specification with reference to the accompanying drawings, in which.

DESCRIPTION OF A PREFERRED EMBODIMENT OF THE PRESENT INVENTION

Figure 1:
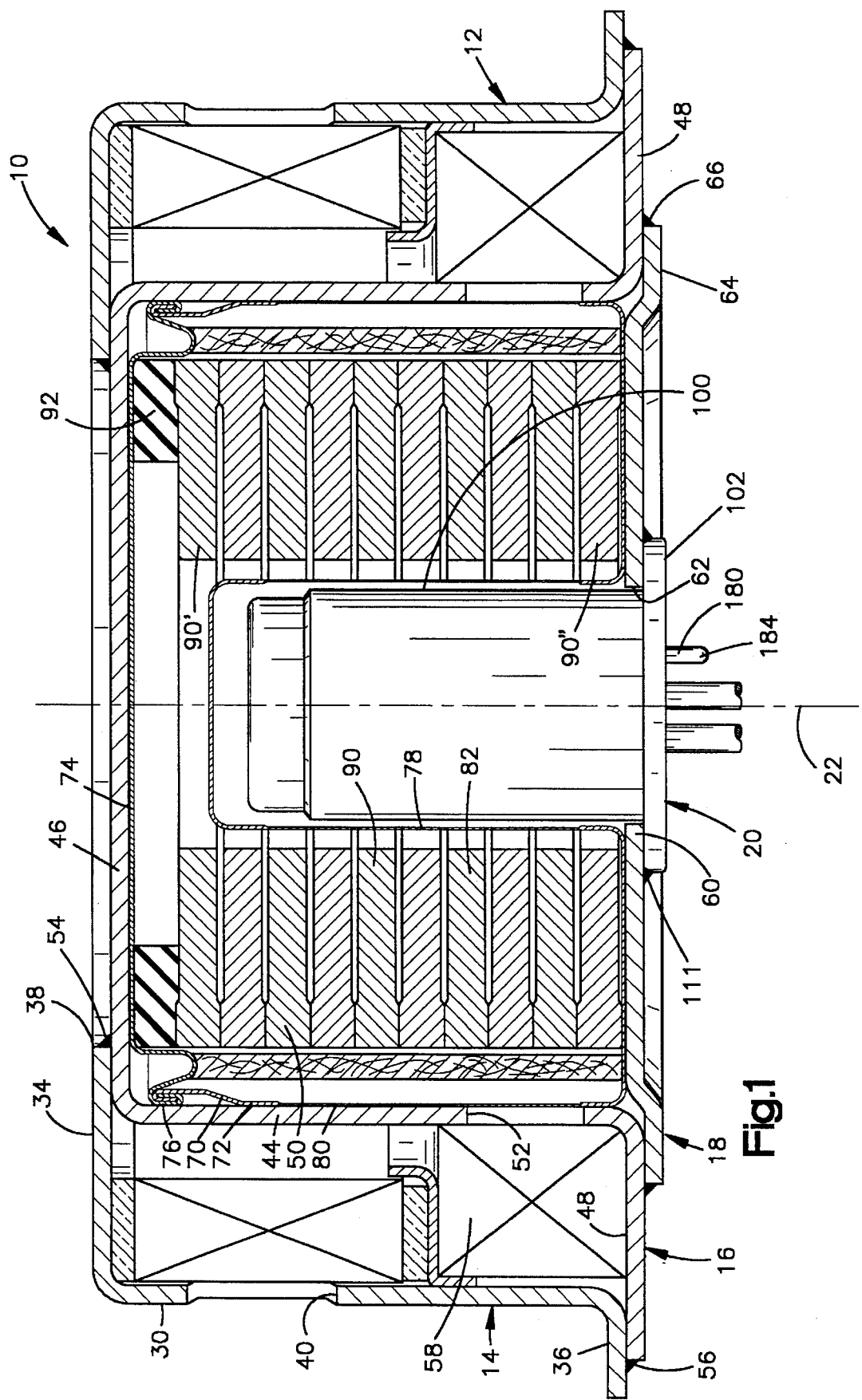
FIG. 1 is a sectional view of an inflator according to the present invention.

Referring to FIG. 1, the inflator 10 of the present invention includes a housing 12. The housing 12 is made of three pieces, a diffuser cup 14, a combustion cup 16, and a combustion chamber cover 18. The inflator 10 also has an initiator 20. The initiator 20 is positioned axially within the inflator 10, along a central axis 22 of the inflator.

The diffuser cup 14 is generally cup-shaped and has a side wall 30. The side wall 30 extends around the central axis 22 of the inflator 10. The side wall 30 extends between a flat upper end wall 34 and a flat lower annular flange 36. The end wall 34 has a central opening 38. An annular array of gas outlet openings 40 is positioned in the diffuser cup side wall 30. The gas outlet openings 40 could be circular openings arranged in one or more circumferential rows around the diffuser cup 14.

The combustion cup 16 also is generally cup-shaped, and is disposed within the diffuser cup 14. The combustion cup 16 has a cylindrical side wall 44 which extends around the inflator axis 22 and is located concentric to and within the diffuser cup side wall 30. The combustion cup side wall 44 extends between a flat upper end wall 46 and a flat lower flange 48. The flat upper end wall 46 and the cylindrical side wall 44 define an annular combustion chamber 50. The cylindrical side wall 44 has an array of openings 52 which are provided in the lower portion of the side wall 44 and lead from the combustion chamber 50 to a filter area 58 between the cylindrical side wall 44 of the combustion cup and the cylindrical side wall 30 of the diffuser cup.

The upper end wall 46 of the combustion cup 16 is welded with a continuous weld 54 to the end wall 34 of the diffuser cup, at opening 38. The combustion cup lower flange 48 is welded with a continuous weld 56 to the diffuser cup lower flange 36.

The combustion chamber cover 18 is generally in the shape of a washer. The cover 18 has an inner portion 60 which defines an opening 62. The opening 62 accommodates initiator 20. The combustion chamber cover 18 also has an outer portion 64. The outer portion 64 is welded by continuous weld 66 to the combustion cup lower flange 48.

A hermetically sealed canister 70 is disposed within the combustion chamber 50 of the combustion cup 16. The canister 70 is made of two pieces, a canister lower section 72 and a canister cover 74. The radial outer edge of the canister cover 74 is crimped, at crimp 76, to an adjacent edge of the canister lower section 72. The canister 70 is preferably made of thin aluminum.

The canister lower section 72 has an inner side wall 78 and an outer side wall 80 which is spaced radially outwardly from the inner side wall 78 and defines, with the inner side wall, an annular chamber 82. The chamber 82 is substantially coextensive with the combustion cheer 50 of the combustion cup. The inner side wall 78 and outer side wall 80, in part, have a reduced thickness compared to the rest of the canister 70.

A plurality of toroidal-shaped gas generating disks 90 are stacked atop each other in the canister chamber 82. The gas generating disks 90 are made of a known material which, when ignited, generates a nitrogen gas. Suitable gas generating materials are disclosed in U.S. Pat. No. 3,895,098. The gas generating material comprises solid reactants in the form of particulates. One of the reactants is an alkali metal azide, and one of the other reactants is a metal oxide. A preferred alkali metal azide is sodium azide. Copper oxide and iron oxide are frequently used metal oxides. These compositions are considered to be stable and typically are ignited at ignition temperatures of about 600° F. or higher. Other suitable compositions ignitable at lower and higher temperatures are known to those skilled in the art.

The gas generating disks 90 are frangible. To cushion the disks, an annular cushion 92 is positioned between the uppermost gas generating disk 90' and the canister cover 74. The lowermost gas generating disk 90" is positioned in the bottom of the lower canister section 72, which is seated against the combustion chamber cover 18. The combustion chamber cover 18 and the annular cushion 92 position the stack of gas generating disks 90 and suppress movement of the disks within the inflator 10. The canister cover 74 and lower canister section 72 completely encase the stack of gas generating disks 90 and seal the disks from ambient atmosphere.

The initiator 20, as shown in FIG. 1, comprises a generally cylindrical body 100 and an annular lower flange 102. The generally cylindrical body 100 seats within the opening 62 of the combustion chamber cover 18, and within a cylindrical cavity defined by the inner side wall 78 of the canister lower section 72. The annular lower flange 102 of the initiator 20 is welded, at weld 111, to the combustion chamber cover 18.

Figure 2:
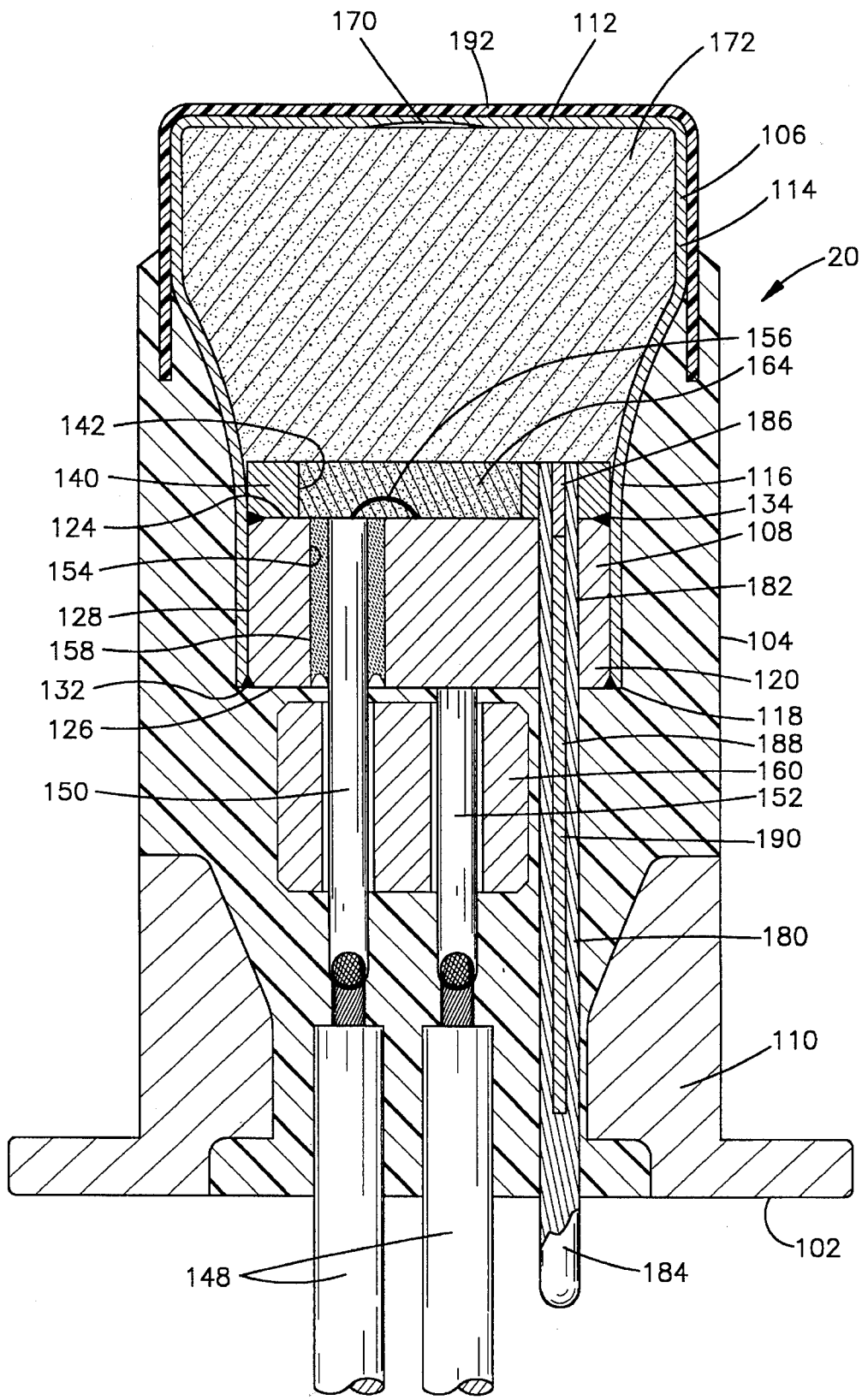
FIG. 2 is an enlarged partial sectional view of an initiator in the inflator of FIG. 1.

Referring to FIG. 2, the initiator 20 has a main plastic body 104. The plastic body 104 connects three main components of the initiator, namely, an upper metal output can 106, a metal header 108, and a retainer 110. The retainer 110 has the annular lower flange 102 which is welded to the combustion chamber cover 18 at weld 111.

The output can 106 is cup-shaped. The can 106 has an end wall 112, with a weakened area 170, and a generally cylindrical side wall 114. The side wall 114 is flared inwardly at flare surface 116, terminating in a lower edge 118 defining an opening 120.

The metal header 108 is a generally solid cylindrical body of smaller diameter than the output can. The metal header 108 fits within the opening 120 of the output can. The header 108 has upper and lower surfaces 124 and 126, and an outer cylindrical surface 128 which extends between the upper and lower surfaces 124, 126. The header 108 is held axially within the opening 120 by weld 132 welding the lower surface 126 to the output can lower edge 118.

The header 108 has a metal ignition charge holder 140 which is affixed to the upper surface 124 of the header 108 by weld 134. The metal ignition charge holder 140 has the shape of a ring and defines an inner cavity 142. The holder 140 has essentially the same outer diameter as the header 108.

The initiator 20 has two conductor pins, i.e., an isolated pin 150, and a ground pin 152. The conductor pins extend longitudinally through the initiator and are parallel to each other. The isolated pin 150 and the ground pin 152 are connected to lead wires 148.

The isolated pin 150 extends through an opening 154 in the header 108 from a position below the header lower surface 126 to the cavity 142 of the ignition charge holder 140. The ground pin 152 extends only to the lower surface 126 of the header 108, to which it is welded. A bridge wire 156, in the charge holder cavity 142, connects the exposed end of the isolated pin 150 and the header upper surface 124. This provides an electric circuit which includes the bridge wire 156, the header 108, the two conductor pins 150, 152, and the lead wires 148. These components are part of a vehicle circuit which includes an acceleration sensor and a power source (not shown). The circuit establishes a current in the bridge wire 156 in the event of a sudden vehicle deceleration for which inflation of a vehicle occupant restraint is desired.

The isolated conductor pin 150 is isolated in the sense that it is insulated from the header 108 by a fused glass seal 158 positioned around the isolated conductor pin 150 in the header opening 154. An R.F. filter 160, in the form of a ferrite bead, is positioned around the conductor pins 150, 152. The ferrite bead is used to short circuit stray R.F. energy to prevent inadvertent initiation of the inflator.

The metal ignition charge holder cavity 142 contains an ignition charge 164. The ignition charge 164 is a pyrotechnic material which burns very rapidly and is ignitable by the bridge wire 156 in the charge holder cavity 142. A preferred ignition charge material is zirconium potassium perchlorate. Other ignition charge materials are known to those skilled in the art, for instance titanium (and its hydrides), potassium perchlorate, barium styphnate, lead styphnate, boron/calcium chromate, and boron/barium chromate. A mixture including lead styphnate, zirconium and lead peroxide can also be used.

The output can 106 contains an output charge 172. The output charge 172 is a material which is capable of being ignited by the ignition charge 164, and which, when ignited, is capable of igniting the gas generating material of the gas generating disks 90 (FIG. 1). On ignition of the output charge 172, the weakened area 170 in the end wall 112 of the output can 106 ruptures, allowing the burning output charge material to be released from the output can. The force of the burning output charge material causes it to rupture the inner side wall 78 of the canister 70 and to impinge against the gas generating disks 90, igniting the disks. The burning disks 90 produce nitrogen gas, which exits through openings 52 in the combustion cup 16, passes through the filter area 58 of the diffuser cup 14, exits through openings 40, and flows into an inflatable vehicle occupant restraint, not shown.

Suitable output charge materials are well known to those skilled in the art. One suitable output charge material is a flammable metal composition which contains an oxidant. A preferred example of an output charge material of this type is boron potassium nitrate ($BKNO_3$). The boron potassium nitrate can be mixed with other materials. For instance, the output charge material can comprise a homogeneous mixture of about 70% to 74% by weight boron potassium nitrate and 26% to 30% by weight of a homogeneous mixture of titanium hydride ($TiH_2$) and potassium perchlorate ($KClO_4$). The boron potassium nitrate consists of a mixture of about 22%–26% by weight boron, 69%–73% by weight potassium nitrate, and 2%–6% by weight of a binder, such as Viton (trademark). The mixture of titanium hydride and potassium perchlorate consists of about 27% to 31% by weight titanium hydride and 65% to 69% by weight potassium perchlorate, with about 2% to 6% by weight of a binder such as VITON. The output charge material is one that normally ignites when heated to approximately 700° F.

Other suitable output charge materials are black powder, nitrocellulose, aluminum potassium perchlorate, tetramethylammonium perchlorate/ammonium perchlorate, a blend of ferric oxide and powdered aluminum (thermite), and metal particles mixed with a propellant, such as titanium/rubber plus ammonium perchlorate. Another suitable output charge material is a blend of magnesium and Teflon or Teflon plus Viton (Trademarks, E. I. dupont de Nemoirs & Co.). Also, a blend of potassium nitrate and titanium hydride potassium perchlorate, marketed by Special Devices, Inc. of Newhall, Calif. can be used.

An elongated auto ignition probe 180 extends longitudinally through the plastic body 104. It is understood that the probe can also be characterized as a pin. The auto ignition probe 180 extends parallel to the conductor pins 150, 152. The auto ignition probe at its upper end 182 extends through the header 108 and the ignition charge holder 140. The auto ignition probe 180 can extend, if desired, through the R.F. filter 160, but it need not. At its upper end 182, the auto ignition probe 180 is in contact with the output charge 172 in the output can 106. At its opposite end 184, the auto ignition probe 180 extends downwardly below the plane of flange 102 and thus projects beyond the confines of the inflator housing 12, as shown in FIG. 1. The lower end 184 is directly exposed to ambient conditions.

The auto ignition probe 180 is hollow except at its lower end 184, at which end it is solid. At the upper end 182, the auto ignition probe 180 is plugged by plug 186 so as to provide an inner enclosed cavity 188. It should be understood that the probe 180 can be crimped at end 182, and that for purposes of the present application, the terms "plugged" and "crimped" are synonymous. The cavity chamber 188 is filled with auto ignition material 190. The auto ignition material 190 is a pyrotechnic material which is ignited by exposure to a temperature lower than the ignition temperature of the output charge material 172 or the gas generating material of the gas generating disks 90 (FIG. 1).

Suitable auto ignition materials are known to those skilled in the art. A preferred auto ignition material is nitrocellulose powder or gun powder. Another suitable auto ignition material is a smokeless powder marketed by the IMR Powder Company of Plattsburgh, N.Y., under the trade designation IMR 4895. The auto ignition material preferably ignites at a relatively low temperature such as about 350° F.

The metal of the auto ignition probe 180 is a heat conductive metal. Suitable heat conductive metals are well known to those skilled in the art. A preferred metal is copper. Aluminum can also be used.

In the event, for example, of a fire involving a vehicle in which the inflator 10 is mounted, the exposed end 184 of the auto ignition probe 180 is quickly heated to a temperature in excess of about 350° F. This temperature is transmitted to the auto ignition material 190, causing the auto ignition material 190 to ignite. Combustion of the auto ignition material creates sufficient internal force in the cavity 188 to cause release of the plug 186. This allows the combustion products of the burning auto ignition material to escape into the output charge 172 and ignite the output charge. Ignition of the output charge 172 causes rupturing of the output can 106 and ignition of the gas generating material of the gas generating disks 90 (FIG. 1). The advantage of the present invention is that the combustion of the gas generating disks 90 occurs at a relatively low ambient temperature.

To assemble the initiator 20 (FIG. 2), the output can 106 and charge holder 140 are filled with output charge material 172 and ignition charge 164, respectively. The charge holder 140 is part of a preassembly which includes the header 108, R.F. filter 160, conductor pins 150, 152, probe 180, leads 148, and glass seal 158. This preassembly is assembled with the output can 106 by making weld 132. An insulator 192 made of an electrically non-conductive material is placed over the output can 106. This prevents the output can 106 from grounding. These components are positioned in a holder (not shown) with retainer 110, and the plastic of body 104 is then poured into place and allowed to set, completing the initiator.

From the above description of the invention, those skilled in the art will perceive improvements, changes and modifications. Such improvements, changes and modifications within the skill of the art are intended to be covered by the appended claims.

Having described the invention, the following is claimed:

1. An apparatus for inflating a vehicle occupant restraint, said apparatus comprising:
   (a) an inflator housing;
   (b) gas generating material within said housing;
   (c) an initiator for igniting said gas generating material, said initiator comprising a container containing an output charge, which when ignited, ignites said gas generating material, said initiator also having electrical conductor means extending into said container for igniting said output charge when a predetermined current travels through said electrical conductor means, said initiator further including a heat conductive member extending into said container and having a surface external to said container and said housing; and
   (d) auto ignition material in said container and in physical contact with said heat conductive member, said auto ignition material being ignitable at a temperature lower than the ignition temperature of said gas generating material and ignitable to ignite said output charge which in turn ignites said gas generating material.

2. The apparatus of claim 1 wherein said heat conductive member is an elongated probe and said surface external to said housing is one end of said probe.

3. The apparatus of claim 2 wherein said probe is hollow along a portion of its length to define a cavity containing said auto ignition material.

4. The apparatus of claim 3 wherein said heat conductive member is plugged at an end opposite said one end to confine said auto ignition material in said cavity.

5. The apparatus of claim 4 in which said heat conductive member plugged end is contiguous with said output charge and the combustion of said auto ignition material causes said plugged end of said heat conductive member to open and release combustion products of said burning auto ignition material into said output charge.

6. The apparatus of claim 5 wherein said auto ignition material is ignitable at a lower temperature than the ignition temperature of said output charge.

7. The apparatus of claim 1 wherein said gas generating material is ignitable at a temperature greater than about 350° F., and said auto ignition material is ignitable at a temperature of about 350° F.

8. The apparatus of claim 1 wherein said initiator extends into said inflator housing and said heat conductive member extends longitudinally through said initiator.

9. The apparatus of claim 1 wherein said inflator housing is cylindrical and has a central axis, said initiator being positioned along said central axis of said inflator housing and said gas generating material being positioned around said initiator, said heat conductive member being an elongated probe extending longitudinally through said initiator.

10. The apparatus of claim 9 wherein said heat conductive member is spaced apart from, and extends parallel to, said electrical conductor means.

11. An apparatus for igniting gas generating material disposed within a housing, said apparatus comprising:
   (a) a body;
   (b) means connected to said body for defining a container containing an output charge;
   (c) means for igniting said output charge;
   (d) an elongated heat conductive member extending into and through said body, said heat conductive member having a first end adjacent said output charge and a second end exposed to ambient conditions; and
   (e) auto ignition material in said body, when ignited, igniting said output charge which in turn ignites the gas generating material;

said heat conductive member conveying ambient heat to said auto ignition material.

12. The apparatus of claim 11 wherein said heat conductive member is hollow along a portion of its length and defines a cavity containing said auto ignition material.

13. The apparatus of claim 12 wherein said heat conducting member is plugged at said first end to confine said auto ignition material in said cavity.

14. The apparatus of claim 13 wherein said auto ignition material is ignitable at a temperature lower than the ignition temperature of said gas generating material.

15. The apparatus of claim 14 wherein said means for igniting said output charge comprises an ignition charge ignitable by a bridge wire.

16. The apparatus of claim 11 wherein said gas generating material is ignitable at a temperature greater than about 350° F. and said auto ignition material is ignitable at a temperature of about 350° F.

17. Apparatus for igniting gas generating material disposed within a housing, said apparatus comprising:
   (a) a body;
   (b) an output can at one end of said body containing an output charge;
   (c) an ignition charge contiguous with said output charge;
   (d) a bridge wire to ignite said ignition charge;
   (e) longitudinally extending conductor pins extending into said body and establishing an electric circuit with said bridge wire; and
   (f) a longitudinally extending heat conductive member extending into said body and parallel to said conductor pins, said heat conductive member having one end exposed to ambient conditions external of said apparatus, having an opposite end contiguous with said output charge, and being hollow along at least a portion of its length to define a cavity, said cavity containing an auto ignition material.

* * * * *